(12) United States Patent
Rebsdorf

(10) Patent No.: US 8,664,792 B2
(45) Date of Patent: Mar. 4, 2014

(54) WIND TURBINE AND A SHAFT FOR A WIND TURBINE

(75) Inventor: Anders Varming Rebsdorf, Skanderborg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 324 days.

(21) Appl. No.: 13/164,926

(22) Filed: Jun. 21, 2011

(65) Prior Publication Data

US 2011/0309632 A1 Dec. 22, 2011

(30) Foreign Application Priority Data

Jun. 21, 2010 (DK) .................................. 2010 70280
Sep. 30, 2010 (DK) .................................. 2010 00886

(51) Int. Cl.
*F03D 9/00* (2006.01)
*H02P 9/04* (2006.01)

(52) U.S. Cl.
USPC ........................................................... 290/55

(58) Field of Classification Search
USPC .................................................... 290/44, 55
See application file for complete search history.

(56) References Cited

U.S. PATENT DOCUMENTS

| 4,173,128 A | 11/1979 | Corvelli |
| 4,335,587 A | 6/1982 | Thomamueller et al. |
| 4,757,211 A | 7/1988 | Kristensen |
| 6,619,918 B1 * | 9/2003 | Rebsdorf ........................ 416/1 |
| 8,398,369 B2 * | 3/2013 | Rebsdorf et al. ............... 416/43 |
| 2011/0309631 A1 * | 12/2011 | Rebsdorf ...................... 290/55 |

FOREIGN PATENT DOCUMENTS

| CN | 1558989 A | 12/2004 |
| GB | 2 149 061 A | 6/1985 |
| WO | 03/037608 A1 | 5/2003 |
| WO | 2007/084710 A2 | 7/2007 |
| WO | 2008/124674 A1 | 10/2008 |

* cited by examiner

*Primary Examiner* — Javaid Nasri
(74) *Attorney, Agent, or Firm* — Roberts Mlotkowski Safran & Cole, P.C.; David S. Safran

(57) ABSTRACT

A drive shaft for a wind turbine is shaped so as to allow for increased bending of the shaft, while being suitable for transferring torque in a wind turbine system. An example of such a shaping is a drive shaft having a helical rib defined on the surface of the shaft. A wind turbine incorporating such a shaft, and a method of manufacture of such a shaft are also described.

11 Claims, 7 Drawing Sheets

WIND TURBINE AND A SHAFT FOR A WIND TURBINE

BACKGROUND OF THE INVENTION

1. Field of the Invention

The present invention relates to a shaft, in particular a drive shaft for a wind turbine power generator, and a wind turbine using such a shaft.

2. Description of Related Art

Rotor support-type wind turbines are a known alternative wind turbine design, wherein the structural load of the hub and rotor blades is provided by a fixed support shaft provided on the wind turbine main frame. As the hub is allowed to rotate freely about the support shaft, consequentially the structural load is transferred to the main frame while the torque provided by the spinning rotor blades is transferred to the generation system.

U.S. Pat. No. 4,757,211 disclose a rotor support-type wind turbine wherein a rotor hub is mounted onto a cylindrical section of the machine housing, the structural load of the rotor hub being supported by the machine housing. A hub shaft extends from the hub to the gearbox, and is accordingly coupled to the generator. Such a shaft is a typical, stiff-bodied drive shaft.

One of the disadvantages of such a system is that in order to compensate for vibrations and bending moments transferred through the hub shaft from the hub, the generator and the gearbox must be mounted on vibration damping elements which are coupled to the machine housing. Furthermore, the hub is mounted to the machine housing utilizing flexible bushings and further damping elements. Damping elements can also used in such constructions to compensate for misalignments between turbine components, e.g., in the case of the hub shaft and the gearbox not being perfectly aligned.

Such damping elements are subject to wear and tear during the lifetime of the system, often requiring replacement every 3-5 years in a relatively costly maintenance operation, at which time the turbine must be taken out of service for an extended period of time.

SUMMARY OF THE INVENTION

It is an object of the invention to provide a shaft for a wind turbine which facilitates improved rotor support-type wind turbine design.

Accordingly, there is provided a horizontal-axis wind turbine having a rotor with a diameter of at least 50 m length, the turbine comprising:
- a wind turbine main frame;
- a generator system;
- a rotor hub, the hub mounted to a rigid support shaft provided on the main frame, wherein the hub is operable to rotate about the support shaft and wherein the support shaft transfers the structural load of the hub to the main frame, and
- a drive shaft rigidly connected to and extending from the hub, wherein the drive shaft is connected to the generator system to transfer torque from the hub to the generator system, and wherein the drive shaft is a mechanically anisotropic shaft adapted to limit the bending moments transferred between the hub and the generator system.

Preferably, the drive shaft comprises at least one rib to facilitate bending of the shaft. In a preferred embodiment, at least a portion of the generator system is rigidly mounted to the main frame.

Such a construction allows for the structural load of the rotor to be carried by the turbine main frame. As the drive shaft is anisotropic, this means it has different mechanical properties in different directions—the shaft is flexible with regard to bending moments, and high in torsional strength. The presence of at least one rib allows for additional flexibility in the shaft, as the shaft body may deflect more easily due to the concertina-like structure of the shaft.

Accordingly, the drive shaft is able to transfer torque from the rotor hub to the generator, but is able to deflect to prevent the transmission of bending moments from the hub to the generator, i.e., the shaft is operable to absorb the bending moments from the rotor hub. As a result, a portion or all of the generator system can be rigidly mounted to the main frame of the wind turbine, removing the need for damping elements to protect the generator system.

Preferably, the drive shaft is rigidly connected to the generator system.

It will be understood that the use of the term "rigidly mounted" can mean that components are fixed without the use of damping elements, i.e., the components are not flexibly mounted in the wind turbine structure, e.g., without the use of rubber mounts, dampers, torque arms, etc.

It will be understood that the use of the term "rigidly connected" can mean that components are directly connected or mounted together, e.g., without damping elements and/or without relative motion between the connected components.

As the shaft used is flexible to absorb the transmission of vibrations between the rotor and the generator system, such rigid mounting and connecting of components can be accomplished, eliminating the need for vibration damping elements in the wind turbine construction.

Preferably, the drive shaft comprises a first end connected to the rotor hub and a second end connected to the generator system, wherein the drive shaft comprises at least one helical rib substantially extending between the first end and the second end, and wherein the drive shaft is arranged such that the direction of twist of the at least one helical rib is in the opposite direction to the direction of rotation of the rotor hub coupled to the first end.

Preferably, the entire generator system is rigidly mounted to the main frame of the wind turbine, eliminating the need for any vibration damping elements in the system.

Preferably, the generator system comprises a gearbox coupled to a generator, the gearbox rigidly mounted to the main frame, wherein the drive shaft is directly connected to the gearbox to drive the generator.

The generator may also be rigidly mounted to the main frame in this construction.

Alternatively, the generator system comprises a generator rigidly mounted to the main frame, and wherein the drive shaft is directly connected to the generator.

As the components can be rigidly mounted to the main frame, there is no need to use vibration damping elements for the components of the generator system. As damping elements are not used, damper failure ceases to be an issue for the design of the turbine. Accordingly, loads experienced by the turbine components can be more easily predicted and modeled, with the result that turbine structure can be optimized at the design stage.

Preferably, the rigid support shaft is provided at a first end of the main frame, and wherein the generator system is releasably mounted to a second opposed end of the main frame.

Preferably, the generator system is releasably mounted to an exterior surface of the main frame.

As the drive shaft is flexible enough to prevent transmission of bending moments from the hub to the generator system, the components do not have to be load-wise mounted within the turbine. Accordingly, as the components of the turbine are releasably mounted to the main frame, this provides for modular construction of the turbine as well as relatively easy servicing of installed turbines—components can be easily removed and replaced without complicated mounting/de-mounting operations. It will be understood that this releasable mounting may be rigidly mounted, i.e., without the use of damping elements.

There is also provided a drive shaft for a wind turbine, the shaft comprising a cylindrical member having a first end for coupling to a wind turbine rotor hub and a second end for coupling to a wind turbine generator system, characterized in that the shaft is shaped between the first end and the second end to facilitate bending of the shaft.

Preferably, the shaft is a mechanically anisotropic shaft which is relatively flexible in bending moments and relatively stiff in torsion, and wherein the shaft comprises at least one rib to facilitate bending of the shaft. Preferably, the shaft is a fiber composite shaft.

As the shaft is suitably shaped to allow for bending along the longitudinal axis of the shaft while torque is transferred from the rotor hub to the generator system, the shaft acts to transfer torque from the rotor hub to the generator, but is able to deflect to prevent the transmission of bending moments from the hub to the generator. The shaft may also bend when torque is not transferred between the rotor hub to the generator system, e.g., in low wind conditions. The use of such a shaft in a wind turbine means that the other wind turbine components may be more rigidly mounted to the main frame of a wind turbine, and reduces the need for damping elements to protect the wind turbine components. Such a shaft may be described as being mechanically anisotropic, as this means it has different mechanical properties in different directions.

The bending can be described as a displacement between the first end and the second end of the shaft perpendicular to the longitudinal axis of the shaft. However, it will be understood that the shaft is not limited to these bending operations alone, and other bending configurations may be provided for, e.g., localized bending along the length of the shaft.

The primary advantages of such a shaft are:
1. Increased bending flexibility reduces forces on bearings in wind turbine.
2. Increased buckling stability of the shaft possibly leads to reduced materials required for construction.
3. The shaping of the shaft may allow for improved methods of construction of the shaft, thereby saving materials, and increasing bending flexibility further.

Preferably, the at least one rib is substantially transverse to the longitudinal axis of the shaft.

The presence of a rib provides for increased reinforcement of the shaft, while also allowing for bending of the shaft itself.

Preferably, the at least one rib is helical.

The use of a helical rib provides reinforcement of the shaft while allowing for bending, and also is adapted to transfer torque through the shaft from a rotor hub to a generator system.

Preferably, the at least one helical rib extends from the first end to the second end.

As the helical rib extends the whole length of the shaft, this allows for the forces experienced by the rib to be distributed across the entire shaft. However, it will be understood that the helical rib may alternatively extend along only a portion of the length of the shaft.

Preferably, the fibers in the drive shaft are arranged such that at the at least one rib, the fibers extend in the direction of a plane substantially orthogonal to the direction of the central longitudinal axis of the drive shaft.

The normally aligned fibers in the drive shaft (i.e., provided on the unribbed shaft surface) extend in the direction of a plane substantially parallel to the direction of the central longitudinal axis of the drive shaft (i.e., horizontally, relative to the surface of the shaft). By contrast, the fibers at the ribs of the shaft extend in a substantially vertical direction, away from the centerline of the shaft. Such an arrangement allows for the bending flexibility of the shaft to be increased, while not compromising on the torsional stiffness of the shaft.

Additionally or alternatively, the shaft may comprise a plurality of helical ribs provided along the shaft. In the case of where a helical rib extends from the first end to the second end of the shaft, the ribs may be provided as parallel tracks of ribs provided along the body of the shaft.

Preferably, the plurality of helical ribs are spaced along the length of the shaft.

This allows for different ribs to be provided at different locations along the body of the shaft.

Preferably, the shaft is arranged so that the twist direction of the at least one helical rib is in the opposite direction to the direction of rotation of a wind turbine rotor hub coupled to the first end.

Depending on the orientation of the shaft in a wind turbine, the twist of the helical rib is adapted so that the rib twists in the opposite direction to the direction of rotation of the wind turbine shaft. This provides increased strength and stiffness of the shaft with regard to torsional forces.

It will be understood that the shaft may comprise a plurality of helical ribs, wherein the helical ribs are provided in different twist directions.

Preferably, the shaft is a hollow body shaft, wherein the external surface of the shaft is threaded.

Preferably, the internal surface of the shaft is threaded.

The shaping of the shaft may occur on the exterior surface of the shaft only, or alternatively may extend through the walls of a hollow cylindrical shaft.

Preferably, the helical rib comprises a helix angle of between 45°-85°.

The helix angle is the angle between the helix and the central longitudinal axis of the shaft.

It will be understood that the shaft may comprise a plurality of helical ribs, wherein the helix angles of the plurality of helical ribs are varied.

Preferably, the wall thickness of the hollow or tubular drive shaft is chosen to be any suitable dimension between 10 mm-400 mm.

Preferably, the drive shaft comprises a nanocomposite material. This may include nano clay, carbon nano tubes, nano silica.

Preferably, the drive shaft is made from an electrically insulating material. This prevents the transmission of current in the event of a lightning strike, which may damage wind turbine components.

Preferably, the drive shaft is at least 3 m in length. Further preferably, the drive shaft is at least 7 meters in length. Preferably, the drive shaft comprises an outer diameter of at least 1 meter.

Preferably, the turbine has a maximum power rating of at least 2 MW.

Preferably, the drive shaft comprises a composite fiber shaft, wherein substantially all of the fibers are oriented in a parallel winding direction. Preferably, at least 50% to 95% of the fibers are oriented in a parallel winding direction.

As the fibers are oriented in the same direction, the torsional strength will be concentrated in that direction. As in wind turbines the drive shaft will only rotate in one direction, consequently substantially all of the torque will only ever be transferred to the generator in that direction. Accordingly, a more efficient construction of drive shaft can be selected for use.

There is further provided a wind turbine comprising:
a rotor hub;
a generator system; and
a drive shaft comprising a cylindrical member having a first end coupled to the rotor hub and a second end coupled to the generator system, characterized in that the shaft is a mechanically anisotropic shaft having at least one rib between the first end and the second end to facilitate bending of the shaft.

Preferably, the at least one rib is helical.

Preferably, the shaft is arranged so that the twist direction of the at least one helical rib is in the opposite direction to the direction of rotation of the rotor hub coupled to the first end.

In particular, there is provided a horizontal-axis wind turbine having a rotor with a diameter of at least 50 m length, the turbine comprising:
a wind turbine main frame;
a generator system, at least a portion of which is rigidly mounted to the main frame;
a rotor hub, the hub mounted to a rigid support shaft provided on the main frame, wherein the hub is operable to rotate about the support shaft and wherein the support shaft transfers the structural load of the hub to the main frame, and
a drive shaft rigidly connected to and extending from the hub, wherein the drive shaft is connected to the generator system to transfer torque from the hub to the generator system, and wherein the drive shaft is a mechanically anisotropic shaft having at least one rib adapted to limit the bending moments transferred between the hub and the generator system.

Preferably, the mechanically anisotropic shaft is a shaft as described above.

Such a construction allows for the structural load of the rotor to be carried by the turbine main frame. As the drive shaft is anisotropic, this means it has different mechanical properties in different directions—the shaft is flexible with regard to bending moments, and high in torsional strength. Accordingly, the drive shaft is able to transfer torque from the rotor hub to the generator, but is able to deflect to prevent the transmission of bending moments from the hub to the generator, thus reducing wearing effects on the bearings. As a result, a portion of the generator system can be rigidly mounted to the main frame of the wind turbine, removing the need for damping elements to protect the generator system.

Preferably, the drive shaft is a composite material shaft.

Preferably, the drive shaft is selected from one of the following: a filament wound shaft, a pre-preg fiber composite shaft, a slatted-construction shaft. Fibers in such a shaft can be chosen among several types of fibers e.g., glass, carbon, basalt, aramid, organic fibers.

Preferably, the generator system comprises a gearbox coupled to a generator, the gearbox rigidly mounted to the main frame, wherein the drive shaft is directly connected to the gearbox to drive the generator.

The generator may also be rigidly mounted to the main frame in this construction.

Alternatively, the generator system comprises a generator rigidly mounted to the main frame, and wherein the drive shaft is directly connected to the generator.

As the components can be rigidly mounted to the main frame, there is no need to use vibration damping elements for the components of the generator system. As damping elements are not used, damper failure ceases to be an issue for the design of the turbine. Accordingly, loads experienced by the turbine components can be more easily predicted and modeled, with the result that turbine structure can be optimised at the design stage.

Preferably, the rigid support shaft is provided at a first end of the main frame, and wherein the generator system is releasably mounted to a second opposed end of the main frame.

Preferably, the generator system is releasably mounted to an exterior surface of the main frame.

As the drive shaft is flexible enough to prevent transmission of bending moments from the hub to the generator system, the components do not have to be load-wise mounted within the turbine. Accordingly, as the components of the turbine are releasably mounted to the main frame, this provides for modular construction of the turbine as well as relatively easy servicing of installed turbines—components can be easily removed and replaced without complicated mounting/de-mounting operations.

Preferably, the generator system comprises a permanent magnet generator.

Preferably, the shaft comprises a composite main shaft body and at least one coupling flange formed from a rigid material suitable for bolting, the at least one coupling flange arranged to couple with at least one end of the main shaft body.

As the coupling flange may be formed from a material different to the fiber-based material of the main shaft body, this means that a more secure bolting connection can be established between the drive shaft and the other wind turbine components. Preferably the coupling flange is formed from a metallic material, e.g., steel.

Preferably, the at least one end of the fiber composite main body is outwardly flared, and wherein the at least one coupling flange comprises a first substantially frustoconical projection, the first frustoconical projection of the at least one coupling flange received within the at least one flared end of the main shaft body.

Providing a flared end of the main shaft body allows for an easy insertion of the coupling flange into the interior of the main shaft body. Such a structure is relatively easily fabricated during curing of a fiber-based shaft.

Preferably, the shaft comprises a plurality of pins extending between the at least one flared end of the man shaft body and the first frustoconical projection of the at least one coupling flange, the plurality of pins retaining the at least one coupling flange within the at least one flared end of the man shaft body.

The use of a series of pins, preferably arranged in a series of parallel rows along the interior of the flared section, allows for the fiber-based main shaft body to be securely coupled to the coupling flange, acting to bolt the coupling flanges securely to the main shaft body.

Preferably, the shaft is arranged such that a portion of fibers at the at least one flared end are wound around the plurality of pins to provide for an equal distribution of forces between the at least one coupling flange and the shaft body, and to improve the retention of the pins in the shaft body.

The fibers may be oriented at the flared section to wind around or be intertwined with the pins at the flared section, providing for an improved coupling and retention of the pins within the main shaft body. Alternatively, holes may be formed, e.g., by drilling, in the at least one flared end of the main shaft body, the holes arranged to receive a plurality of pins extending from the first frustoconical projection of the at least one coupling flange into the at least one flared end of the man shaft body.

Preferably, a coupling flange is provided at either end of the main shaft body. Preferably, a first coupling flange is bolted to the rotor hub and a second coupling flange is bolted to the generator system.

There is further provided a method of manufacturing a drive shaft for a wind turbine, the method comprising the steps of:

providing a mandrel;
applying fibers and a matrix to the surface of the mandrel to form at least one fiber layer; and
curing the at least one fiber layer to form a fiber composite shaft, wherein at least a portion of the surface of the mandrel is shaped, so that the at least one fiber layer is contoured according to the mandrel surface and wherein the step of curing forms a fiber shaft shaped to facilitate bending of the shaft.

Preferably, the fibers are arranged such that the fibers of successive layers are oriented in substantially the same direction along the body of the mandrel. Preferably, the mandrel comprises at least one rib provided on the surface of the mandrel.

The provision of a shaped mandrel allows for a shaped shaft to be easily formed, which may be then incorporated into improved designs of wind turbine.

Preferably, the method comprises the steps of providing a mandrel having at least one rib.

Preferably, the method comprises the steps of providing a mandrel having at least one helical rib.

Preferably, the method further comprises the step of, after curing the at least one fiber layer to form the fiber composite shaft, applying a torsional force to the shaft to remove the shaft from the mandrel.

Preferably, the rigid support shaft is releasably mounted to the first end of the main frame.

Preferably, the wind turbine comprises at least two sets of hub bearings provided at the support shaft, the hub mounted to the sets of hub bearings.

Preferably, the drive shaft is directly connected between the hub and the generator system.

As the drive shaft extends from the hub, with the structural load of the rotor hub carried by the rigid support shaft and the main frame, there is no need for any support of the drive shaft in the turbine.

Preferably, the drive shaft is a hollow shaft.

Preferably, the wall thickness of the drive shaft may chosen to be any suitable dimension between 10 mm-400 mm. As an example, a shaft formed from carbon fibers may have a wall thickness of approximately 30 mm, while a shaft formed from glass fibers may have a wall thickness of approximately 80 mm.

Preferably, the drive shaft comprises a nanocomposite material. This may include nano clay, carbon nano tubes, nano silica.

Preferably, the drive shaft is made from an electrically insulating material. This prevents the transmission of current in the event of a lightening strike, which may damage wind turbine components.

Preferably, the drive shaft is at least 3 m in length.

Preferably, the turbine has a maximum power rating of at least 2MW.

Preferably, the drive shaft comprises a composite fiber shaft, wherein substantially all of the fibers are oriented in a parallel winding direction. Preferably, at least 50% to 95% of the fibers are oriented in a parallel winding direction.

As the fibers are oriented in the same direction, the torsional strength will be concentrated in that direction. As in wind turbines the drive shaft will only rotate in one direction, consequently substantially all of the torque will only ever be transferred to the generator in that direction. Accordingly, a more efficient construction of drive shaft can be selected for use, as less material may be required to provide the same performance of shaft.

Preferably, the step of applying comprises applying a majority of fibers in substantially the same direction along the body of the shaft.

Preferably, the drive shaft would comprise a composite fiber shaft having a majority of fibers lying in the same direction along the body of the shaft, preferably at least 50% to 95% of fibers. Preferably, the majority of fibers are orientated approximately 45° to the central axis of the shaft.

A shaft formed having such fibers in parallel alignment will have a high torsional strength in one direction. As the drive shaft of a wind turbine is mainly in general only required to transmit torque in one direction, this results in a drive shaft for a wind turbine having a greater torsional strength for same amount of fibers used in the construction of the shaft, and consequently lower weight shafts may be produced having the same torque rating as currently-used standard shafts.

Preferably, the method further comprises the step of rotating the mandrel as fibers are applied to it.

Preferably, the step of applying comprises applying the fibers from a jig adjacent the mandrel as the jig is advanced along the length of the mandrel.

In a preferred embodiment, the mandrel is rotated in a first direction as the jig applies fibers while advancing in a forward direction along the length of the mandrel, and the mandrel is rotated in a second reverse direction as the jig applies fibers while advancing in a reverse direction along the length of the mandrel.

This results in a second layer of fiber being applied substantially in the same direction as the fibers of a first layer, at the same angle to the normal, as opposed to the cross-hatch application of successive fiber layers provided by known approaches. The action of reversing the direction of rotation of the mandrel may be accomplished simply by reversing the polarity of the motor rotating the mandrel once the jig reaches the end of the mandrel. This procedure can be repeated for as many passes of the jig along the mandrel as required, and consequently for as many layers of fibers as required. As a result, the fibers applied from the jig to the mandrel will all be lying in substantially the same direction along the body of the mandrel, at substantially the same angle to the normal.

Preferably, the step of providing a mandrel comprises providing a substantially conical mandrel. The mandrel may comprise a conical frustum.

The use of a substantially conical mandrel may result in easier de-mounting of a shaft formed on the mandrel.

An embodiment of the invention will now be described, by way of example only, with reference to the accompanying drawings.

DETAILED DESCRIPTION OF THE INVENTION

Figure 1A:
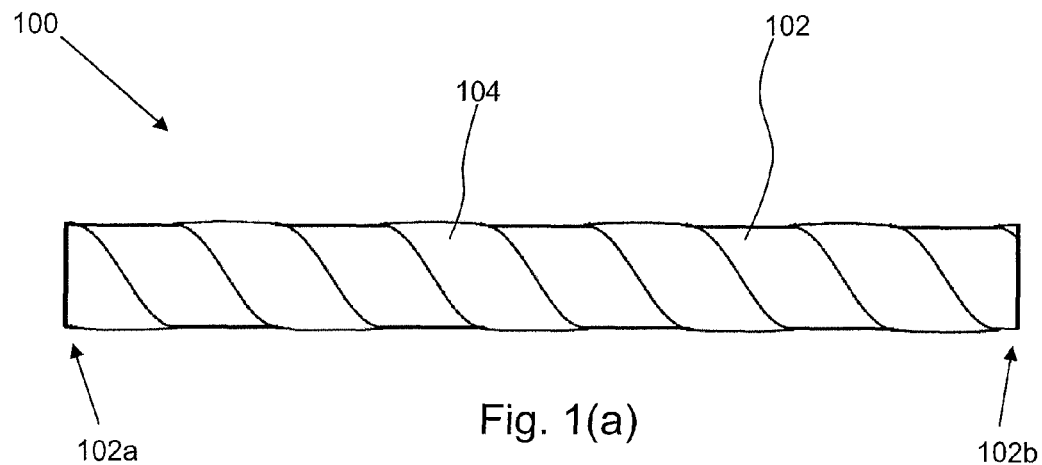
FIG. 1(a) is a plan view of a drive shaft according to a first embodiment of the invention.
Figure 1B:
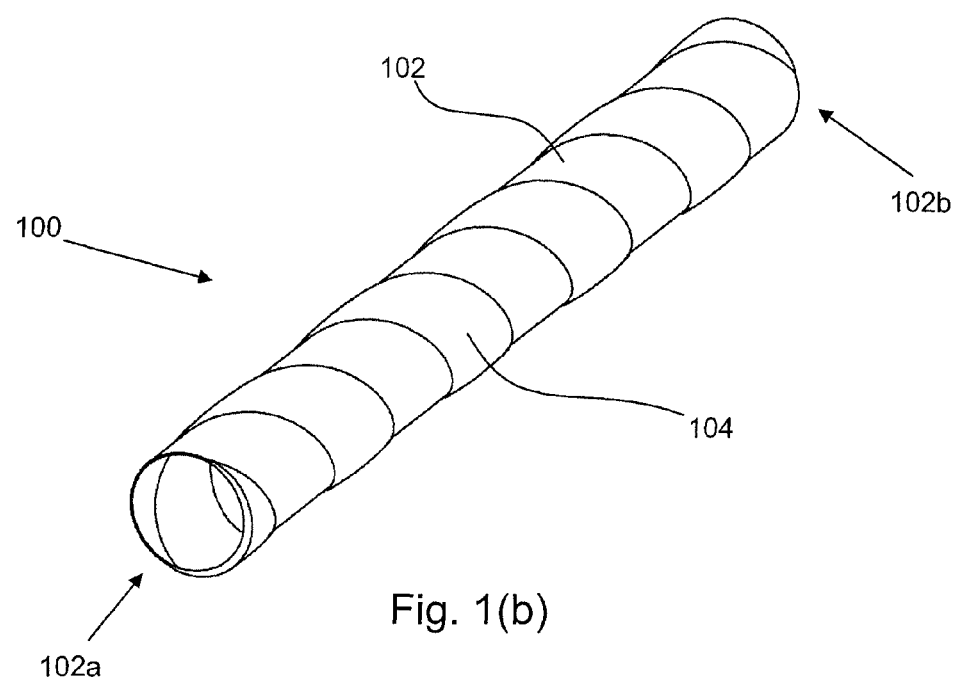
FIG. 1(b) is a perspective view of the drive shaft of FIG. 1(a)

With reference to FIG. 1, a drive shaft for a wind turbine according to a first embodiment of the invention is indicated generally at 100. The shaft 100 comprises a hollow cylindrical body 102 having first and second ends 102a, 102b. A raised helical rib 104 is provided on the external surface of the shaft body 102, the rib 104 extending along the body of the shaft from the first end 102a to the second end 102b. The helical rib 104 is provided having a helix angle of approximately 45° (i.e., the angle between the helix and the central axis of the shaft).

The presence of a suitable shaping of the shaft body, e.g., rib 104, allows for the shaft 100 to be more easily bent relative to a known straight-walled shaft.

Figure 2A:
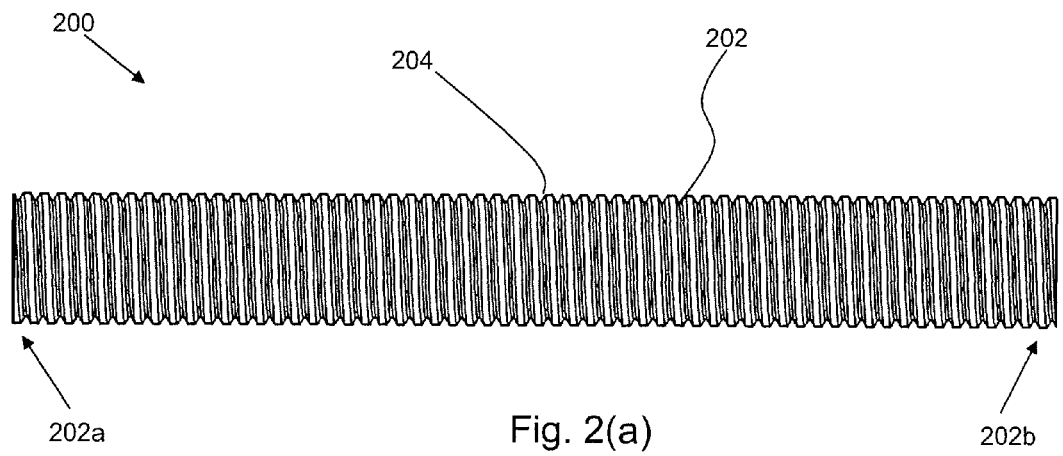
FIG. 2(a) is a plan view of a drive shaft according to a second embodiment of the invention.
Figure 2B:
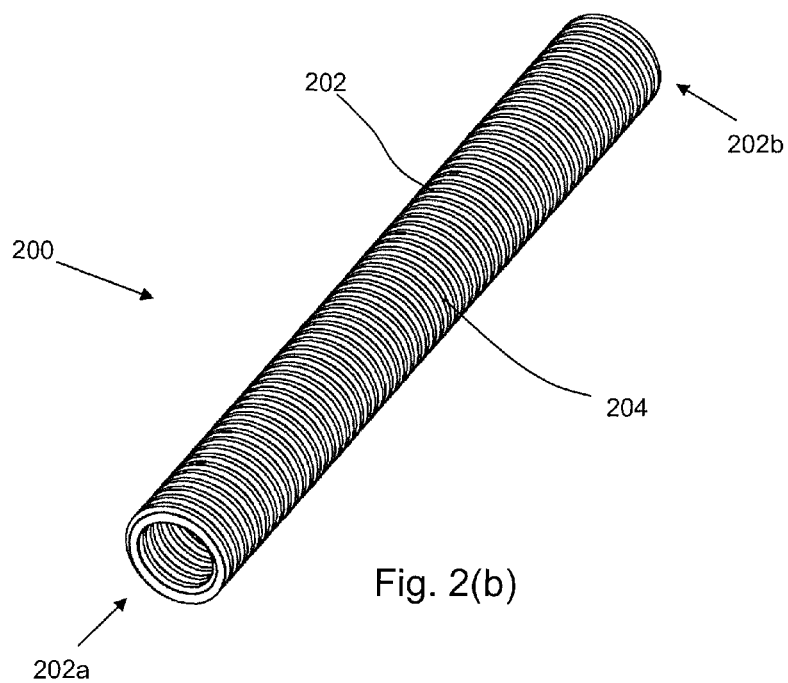
FIG. 2(b) is a perspective view of the drive shaft of FIG. 2(a)

FIG. 2 illustrates a second embodiment of a drive shaft, indicated generally at 200. Again, the shaft 200 comprises a hollow cylindrical body 202 having first and second ends 202a, 202b. A raised helical rib 204 is provided on the external surface of the shaft body 202, the rib 204 extending along the body of the shaft from the first end 202a to the second end 202b. In this embodiment, the helical rib 204 is provided having a helix angle of approximately 85° (i.e., the angle between the helix and the central axis of the shaft).

Figure 3A:
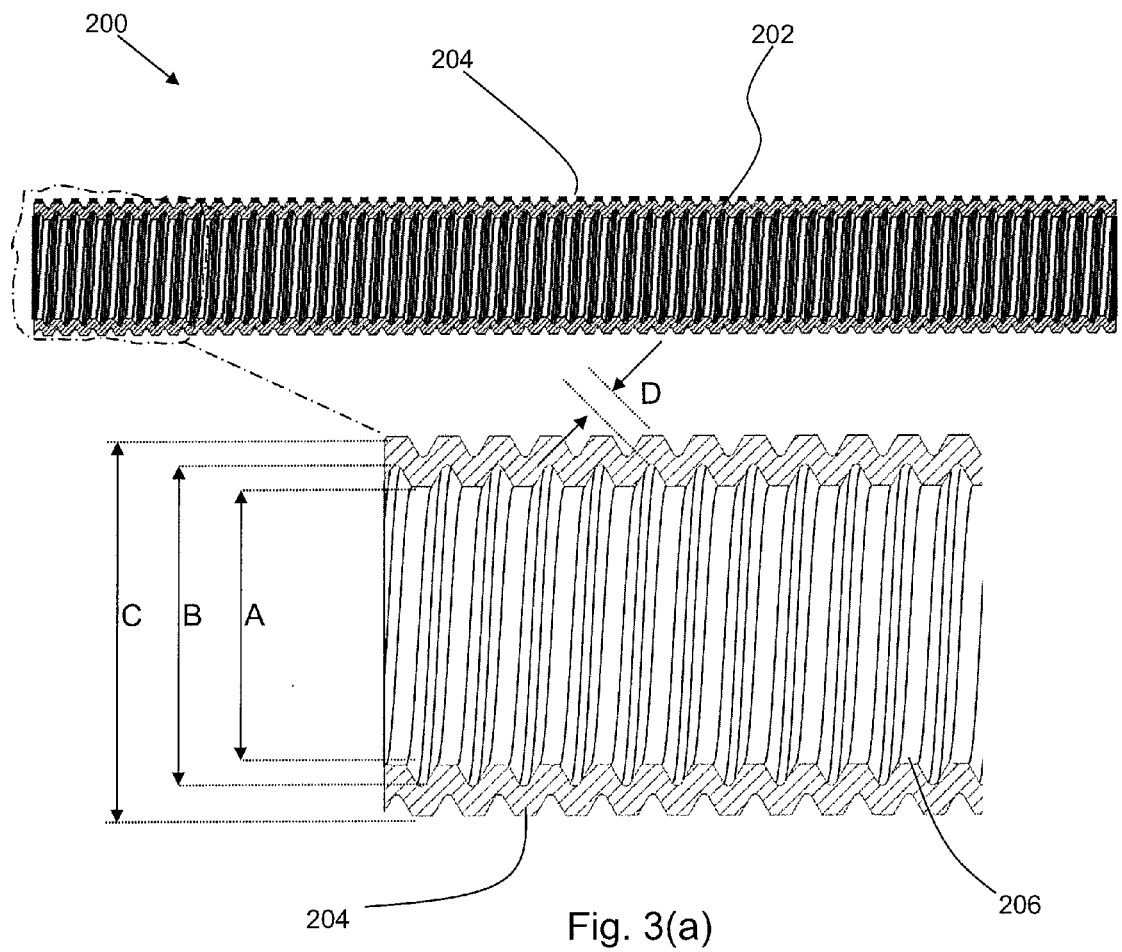
FIG. 3(a) shows an enlarged cross-sectional view of a portion of the shaft of FIG. 2(a)

FIG. 3(a) shows an enlarged portion of a cross-sectional view of drive shaft 200. On the internal surface of the drive shaft body 202, a helical rib 206 is defined, corresponding to the helical rib 204 defined on the external surface of the shaft body 202. In this embodiment, the shaft can be seen to be ribbed on both the internal and external surfaces of the hollow shaft body 202.

It will be understood that various alternative shapes of the shaft body 102, 202 may be utilized, for example the rib may be formed having any suitable helix angle (e.g., between 45°-85°); the rib may extend only along a portion of the shaft body; several different ribs may be provided; the ribs may be orthogonal to the central axis of the shaft; a plurality of ribs may be provided, each having different helix angles; a series of parallel rib tracks may be provided, etc. It will be understood that any suitable configuration of shaft may be employed, e.g., the shaft may be ribbed or threaded, either on the internal surface or on the external surface, or on both the internal and external surfaces.

While the embodiment of FIG. 3(a) shows the cross-sectional profile of the helical rib 204 to be substantially V-shaped, it will be understood that any suitable thread profile type may be used for the rib cross-sections, for example V-threads; Whitworth threads; pipe threads; knuckle threads; round threads; Acme threads; trapezoidal threads; buttress threads; German buttress threads; square threads; steel conduit threads; etc.

It will further be understood that the drive shaft 100, 200 may be constructed having reinforcement elements provided within the interior of the shaft 100, 200. Such reinforcement elements may comprise bars, spokes, plates, foam bodies, etc., which act to preserve the structural integrity of the shaft body.

Figure 3B:
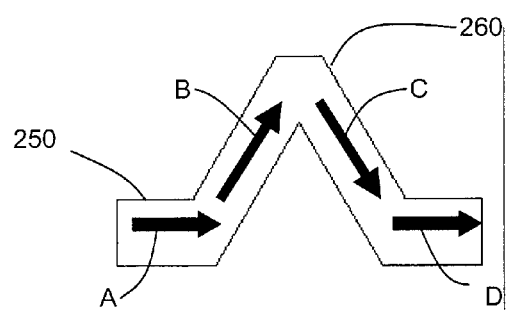
FIG. 3(b) is an illustration of the alignment of the fibers in a rib of the shaft of FIG. 2(a)

With reference to FIG. 3(b), the relative fiber orientation in a sample shaft 250 due to the presence of a rib 260 is illustrated. As in a normal fiber-based shaft, the fibers are generally aligned in a horizontal direction with the surface of the shaft 250 (as indicated by arrow A). When the fibers reach a rib 260, the fiber direction moves in a substantially vertical direction (arrow B), away from the central longitudinal axis of the shaft. The fibers may again be provided in a horizontal alignment, before returning to a substantially vertical orientation (arrow C) in the direction of the shaft central axis. As the fibers exit the rib 260, they return to a nominal horizontal alignment (arrow D).

As the normal rigidity of a fiber-based shaft is partly due to the parallel alignment of the fiber orientation in the same direction along the length of the shaft, the change in fiber orientation illustrated in FIG. 3(b), from relatively horizontal to vertical to horizontal, provides for an improved flexibility in the overall shaft, as the fiber direction is interrupted by the approximately 90 degree change in fiber direction. Accordingly, the stiffness of the shaft in relation to bending is reduced. However, as the fibers continue to travel in the same direction from the first end to the second end of the shaft, the torsional stiffness of the shaft is not compromised by the use of such ribs.

With reference to the embodiment shown in FIG. 3(a), a sample set of the dimensions of a suitable ribbed shaft comprise an internal diameter of the shaft between the surfaces of the internal ribs 206 (indicated as distance A in FIG. 3(a)) of approximately 400 mm; an internal diameter B between the bases of the internal ribs 206 of approximately 500 mm; an external diameter C of the shaft between the surfaces of the external ribs 204 of approximately 640 mm; and an approximate angled distance between successive internal and external ribs 204, 206 (indicated by distance D) of approximately 70 mm. Such a shaft design will provide a flexible shaft having at least one rib to facilitate bending of the shaft. It will be understood that the shaft of the invention is not limited to these particular dimensions.

A particular method of construction may be employed in order to manufacture a composite fiber shaft having a majority of fibers lying in the same direction, namely utilizing fibers applied to a rotating mandrel to form a hollow shaft. In such a system, a mandrel is rotating in a particular direction (e.g., clockwise), while a jig running adjacent the mandrel and along the length of the mandrel applies fibers to the surface of the rotating mandrel, the fibers being applied at an angle to the centerline of the mandrel (e.g., 45° to the normal). The jig runs back-and-forth along the length of the mandrel, resulting in successive layers of fibers building up on the mandrel, resulting in a cross-hatch style arrangement of fibers along the body of the mandrel. The fibers are treated in position to form a hollow shaft.

It will be foreseen that the drive shaft 100,200 may be of any suitable construction, for example, a hollow composite shaft having a thin-walled steel inner tube. The presence of the steel inner tube helps to prevent delamination and buckling of the shaft.

In a proposed new method of manufacture, during the fiber application stage, the jig applies a first layer of fibers at a first angle α to the normal. After the jig reaches the end of the mandrel on the first pass, the direction of rotation of the mandrel is reversed (e.g., the rotation direction of the mandrel changes from clockwise to anti-clockwise), and the jig turns and travels in the reverse direction along the body of the mandrel. This results in the second layer of fibers being applied substantially in the same direction as the fibers of the first layer, at an angle α to the normal, as opposed to the cross-hatch application of successive fiber layers provided by the known approach.

It will be understood that the fibers may be applied as successive layers of fiber-based material, wherein successive layers have a relative adhesive attraction to each other and to the underlying mandrel. Such a relative adhesion is sufficient to temporarily hold the fiber layers in position during application to the mandrel, such that the applied layers will not unwind from the mandrel as the direction of rotation of the mandrel is reversed.

As soon as the jig returns to the start of the mandrel, it turns and resumes in a forward direction along the mandrel, and the direction of rotation of the mandrel is restored to the original direction (e.g., returning to clockwise rotation). The action of reversing the direction of rotation of the mandrel may be accomplished simply by reversing the polarity of the motor rotating the mandrel once the jig reaches the end of the mandrel.

This procedure can be repeated for as many passes of the jig along the mandrel as required, and consequently for as many layers of fibers as required. As a result, the fibers applied from the jig to the mandrel will all be lying in substantially the same direction along the body of the mandrel, at substantially the same angle α to the normal.

A shaft formed having such fibers in parallel alignment will have a high torsional strength in one direction. As the drive shaft of a wind turbine is mainly in general only required to transmit torque in one direction, this results in a drive shaft for a wind turbine having a greater torsional strength for same amount of fibers used in the construction of the shaft, and consequently lower weight shafts may be produced having the same torque rating as currently-used standard shafts.

Preferably, the drive shaft would comprise a composite fiber shaft having a majority of fibers lying in the same direction along the body of the shaft, preferably at least 50% to 95% of fibers.

Figure 4:
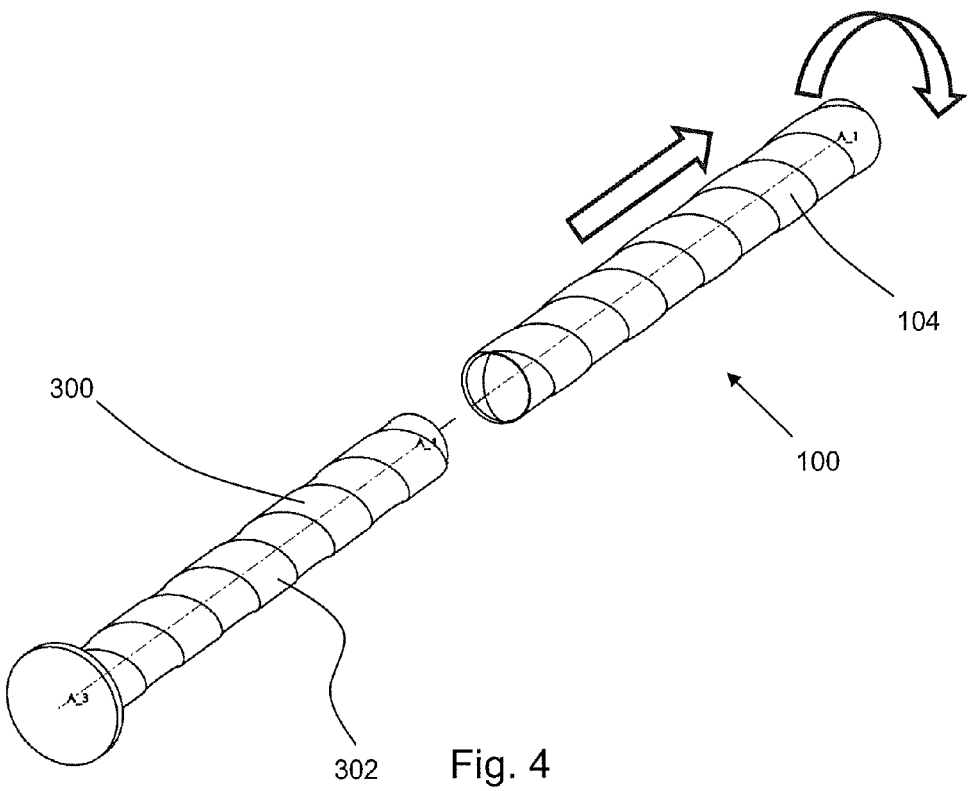
FIG. 4 is a perspective view of the shaft of FIG. 1(a) and an associated mandrel.

Preferably, a method of construction employed to form such a drive shaft 100,200 described above may comprise use of a shaped mandrel. FIG. 4 illustrates a sample mandrel 300 used in the construction of a drive shaft 100 of the first embodiment.

In such a method, with reference to FIG. 4, the mandrel 300 used may comprise a helical rib 302 formed on the surface of the mandrel 300. As before, fiber layers are applied to the surface of the mandrel 300. In this case, the fiber layers are contoured according to the shaping of the mandrel 300, and conform to the surface of the mandrel 300 and the profile of the helical rib 302. Once sufficient layers have been applied to the mandrel 300, the fibers are cured, and a composite drive shaft 100 having a profile corresponding to the shape of the mandrel 300 and the rib 302 is formed.

Once the drive shaft 100 is formed, the shaft can be relatively easily removed from the mandrel 300 by the application of an appropriate torsional force to the shaft 100—the shaft 100 can be "unscrewed" from the mandrel 300.

The mandrel 300 shown in FIG. 4 is configured to form the drive shaft 100, in that the helical rib 302 provided on the surface of the mandrel 300 has a helix angle of 45°, to form ribs 104 on the body of the shaft 100 having the same helix angle. It will be understood that any suitable configuration and/or dimension of ribs may be provided on the surface of the mandrel 300, according to the desired profile of threads/ribs to be formed on the drive shaft. In addition, the mandrel 300 may comprise any suitable arrangement of ribs or rib types on the surface of the mandrel 300. It will be understood that the mandrel 300 may be shaped in any suitable manner in order to provide a shaft 100 that facilitates bending.

Furthermore, it will be understood that different general shapes of mandrel 300 may be employed. With reference to FIG. 4, a further embodiment of mandrel configuration for use to form a drive shaft according to the invention is indicated at 400. In this embodiment, the mandrel 400 comprises a tapered, substantially conical body, helical ribs 402 being formed on the surface of the mandrel 400. Again, fiber layers may be applied to the surface of the mandrel 400, the fiber layers being contoured to follow the surface of the ribs 402 of the mandrel 400. After curing, the fiber layers form a drive shaft 100*a* with appropriate helical ribs 104*a*. As the mandrel is tapered (or conical), the formed shaft 100*a* may be easily removed from the mandrel 400 trough the application of a suitable torsional or twisting force 100—the shaft 100 is "unscrewed" from the mandrel 300 in a relatively easier manner than in the untapered mandrel of FIG. 4.

It will be understood that any degree of tapering of the mandrel 400 may be employed, as well as any suitable shape of mandrel, e.g., the mandrel may comprise a substantially conical body, a conical frustum body, etc. The use of such a substantially conical body may provide for easier removal of the formed shaft from the mandrel, for example in situations where the shaft is relatively large, e.g., greater than 3 meters long.

Figure 5:
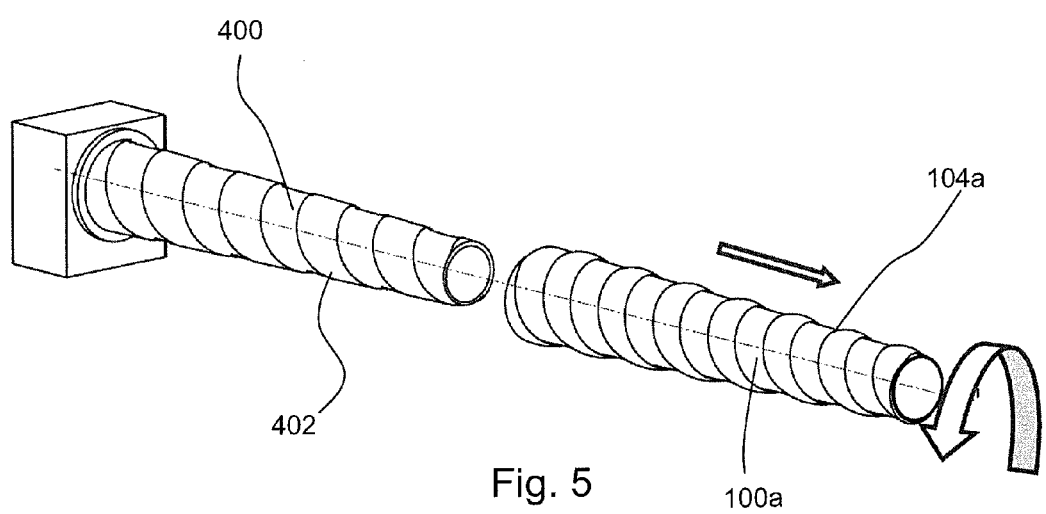
FIG. 5 is a perspective view of an alternative mandrel for use to form an alternative drive shaft.

While the embodiment of formed drive shaft 100*a* shown in FIG. 5 is illustrated to be tapered or conical on the exterior surface of the drive shaft 100*a*, it will be understood that the tapered mandrel 400 may be used to produce any suitable configuration of drive shaft. In particular, while the interior surface of the formed drive shaft may be tapered as a result of being formed on the tapered mandrel 400, the process may be configured so that the exterior surface of the formed drive shaft is not tapered, e.g., by applying a proportionally greater quantity of fiber layers to the relatively thin end of the mandrel 400.

It will be understood that other methods of manufacturing drive shafts according to the invention may be employed. For example, composite material may be applied to the surface of a mandrel, the application configured so that proportionally more composite material is positioned along certain areas, allowing for suitable ribs or threads to be built up on the mandrel.

In use, the drive shaft 100, 200 is provided in a wind turbine system, wherein the first end 102*a*, 202*a* of the shaft 100, 200 is coupled to a wind turbine rotor hub, and the second end 102*b*, 202*b* of the shaft 100, 200 is coupled to a generator system.

As the drive shaft 100, 200 is shaped between the first and second ends, it allows for the shaft 100, 200 to bend between the relatively rigid fixing points at either end of the shaft, facilitating bending of the shaft 100, 200 as torque is transferred from the first end 102*a*,202*a* to the second end 102*b*, 202*b*. The use of such a shaft which provides for bending allows for the use of wind turbine constructions having reduced components, e.g., less need for damping elements.

Reference is now made to particularly preferred embodiments of wind turbine.

Figure 6:
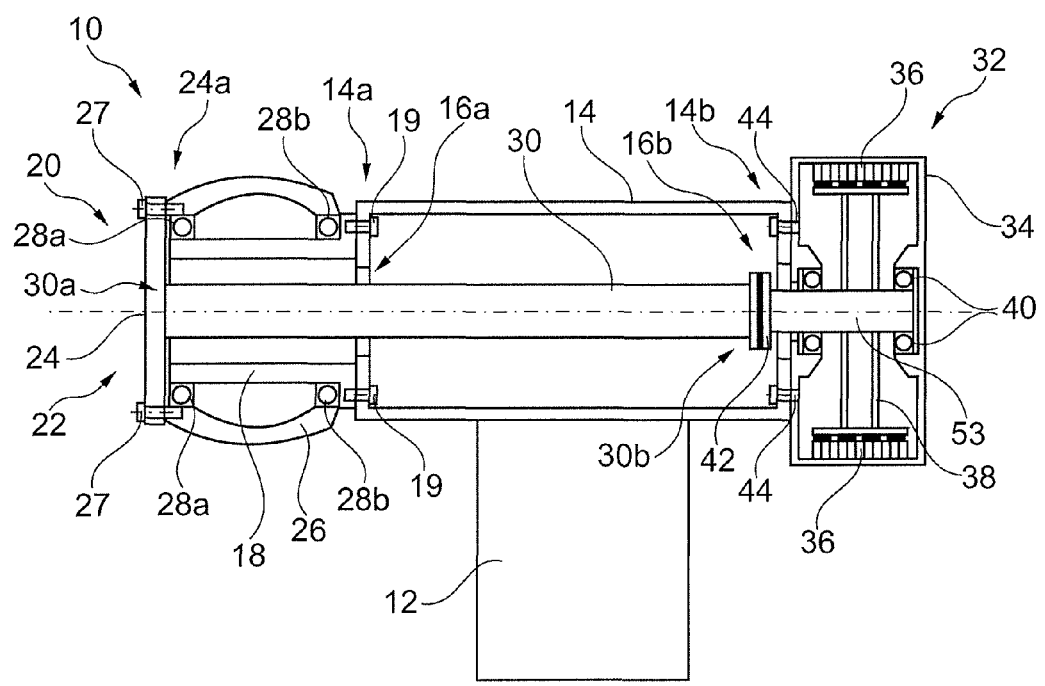
FIG. 6 illustrates a first embodiment of a wind turbine incorporating a drive shaft according to the invention.

With reference to FIG. 6, a wind turbine is indicated generally at 10. The wind turbine 10 comprises a tower 12 and a turbine main frame 14, the main frame 14 provided at the upper end of the tower 12 having a windward side 14a and an opposed leeward side 14b. First and second through-going apertures 16a, 16b are defined in the windward side 14a and the opposed leeward side 14b respectively, the apertures 16a, 16b in line with each other, to allow a shaft to extend through the main frame 14 from the windward side 14a to the leeward side 14b. The main frame 14 is adapted to swivel on top of the tower 12 to correct the yaw angle of the wind turbine 10, so that the turbine is continually facing the wind direction.

A support shaft 18 is provided at the windward side 14a of the main frame 14, rigidly mounted to the external surface of the main frame 14. The support shaft 18 comprises a cylindrical tubular body which is positioned about the first aperture 16a, concentric to the aperture 16a. In FIG. 6, the support shaft 18 is shown as bolted to the main frame 14 using bolts 19, but it will be understood that any suitable attachment method may be used to secure the support shaft 18 to the main frame 14. Preferably, the support shaft 18 is releasably mounted to the main frame 14, to allow for removal of the support shaft 18 from the wind turbine 10, e.g., for servicing and maintenance purposes.

The wind turbine 10 further comprises a rotor, indicated generally at 20, having a plurality of rotor blades (not shown) mounted thereon. The rotor 20 comprises a rotor hub 22 having a front flange 24 and a collar 26 depending from a turbine side 24a of the flange 24.

The rotor 20 is provided on the wind turbine 10 by mounting the rotor hub 22 to the support shaft 18. The collar 26 fits about the support shaft 18, with two sets of bearings 28a, 28b provided between the support shaft 18 and the collar 26, the bearings 28a, 28b allowing the rotation of the rotor hub 22 about the support shaft 18. With this construction, the structural load or weight of the rotor 20 is transferred to the structure of the wind turbine 10 from the support shaft 18 to the main frame 14. The rotor hub 22 is directly mounted to the support shaft 18, i.e., there are no vibration damping elements used between the rotor 20 and the support shaft 18.

It will be understood that while two sets of bearings 28a, 28b are shown in the embodiment of FIG. 6, any suitable number or arrangement of bearings may be used which are operable to support the weight of the rotor 20 while allowing rotation of the rotor hub 22 about the support shaft 18.

While in the rotor hub 22 of FIG. 6, the collar 26 is shown as being bolted to the front flange 24 of the rotor hub 22 using bolts 27, it will be understood that any suitable hub construction may be used, e.g., a single cast-iron structure.

A turbine drive shaft 30 extends from a first end 30a rigidly connected to the turbine side 24a of the front flange 24, the drive shaft 30 extending through the support shaft 18 into the interior of the main frame 14 towards the opposed leeward side 14b of the main frame 14 to a second end 30b. The drive shaft 30 is chosen to be mechanically anisotropic, i.e., the shaft has different mechanical properties in different directions. In particular, the drive shaft 30 is chosen to be flexible with regard to bending moments, and high in torsional strength. Due to the wind turbine construction, the drive shaft 30 is only required to transfer torque from the rotor 20 to a generator of the wind turbine—the drive shaft 30 does not carry any of the structural load of the rotor 20. Accordingly, shaft bearings or rollers are not necessary in the illustrated construction.

Preferably, the drive shaft 30 is shaped to provide for bending of the shaft as torque is transferred from the rotor 20 to a generator, as described above. Further preferably, the shaft 30 comprises at least one rib (not shown) defined on the body of the shaft 30, preferably a helical rib.

Where the shaft 30 comprises at least one helical rib, preferably the shaft 30 is aligned so that the twist direction of the helical rib is opposed to the rotation direction of the wind turbine rotor 20. In this configuration, the structural forces provided by the helical rib act to oppose the torsional forces acting on the shaft 30 during rotation. Accordingly, the shaft 30 may be configured to be reinforced to the effects of these torsional forces, leading to increased shaft performance.

As the drive shaft 30 is flexible to bending moments, this allows the shaft 30 to substantially prevent the transmission of any bending forces from the rotor 20 to any generator components (for example, as a result of misaligned or moving shaft ends), consequently reducing the wear-and-tear of such components.

Preferably, a composite shaft is used, which is manufactured with the aim of producing a shaft which is flexible in bending while being strong in torsion. Examples of suitable composite shafts include a filament winding-type shaft, a pre-preg fiber shaft (i.e., a "pre-impregnated" composite fiber shaft), a slatted construction-type shaft (wherein the shaft is formed by a plurality of slats arranged in, for example, a longitudinal or helical manner, the slats forming a tubular shaft, adjacent slats coupled to one another using a suitable flexible adhesive).

The wind turbine 10 further comprises a generator indicated generally at 32 provided at the leeward side 14b of the main frame 14. The generator 32 comprises a generator housing 34, a generator stator 36 affixed to the housing 34, and a generator rotor 38 provided in the housing 34. The generator rotor 38 is mounted to an extension 53 of the drive shaft 30. This extended shaft 53 is supported via bearings 40 in the generator housing 34, such that the generator rotor 38 is operable to rotate within the housing 34. Rotation of the generator rotor 38 relative to the generator stator 36 results in the generation of electrical power in the generator 32. It will be understood that the wind turbine 10 may comprise any suitable connection mechanism coupled with the generator 32 such that the generated power may be transmitted to the power grid.

Other generator configurations can be foreseen, for example, the drive shaft 30 may extend through the main frame 14 past the leeward side 14b of the main frame 14. In such a construction, the generator rotor 38 may be directly mounted to the drive shaft 30.

The generator 32 is provided at the leeward side 14b of the main frame 14, the generator 32 further comprising a generator coupling 42 connected to the generator rotor 38, the generator coupling 42 extending into the interior of the main frame via the second aperture 16b. The second end 30b of the drive shaft 30 is connected to the generator coupling 42. Accordingly, the drive shaft 30 is directly connected to the generator rotor 38, resulting in a direct-drive machine.

Preferably, the generator 32 is releasably mounted to the wind turbine main frame 14. In FIG. 6, the generator housing 34 is coupled to the leeward side 14b of the main frame 14 using bolts 44. It will be understood that any suitable coupling may be used to secure the generator 32 to the main frame 14.

As the rotor support construction of the wind turbine 10 means that the structural load of the rotor 20 is supported by the main frame 14 and tower 12 of the turbine 10 itself, and as the drive shaft 30 is flexible enough to substantially prevent the transmission of bending moments from the rotor hub 22 to the generator 32, accordingly there are substantially no reaction forces acting on the generator 32 apart from the torque transmitted by the drive shaft 30. The absence of reaction forces removes the need for the generator 32 to be load-balanced when installed in the turbine 10, and accordingly the generator 32 can be rigidly mounted to the main frame 14, i.e., without requiring the use of vibration damping elements. It will be understood however that the shaft having at least one rib to facilitate bending of the shaft, as described above, may be used in wind turbines having generator systems not rigidly mounted to the main frame.

As no vibration damping elements are used in the construction, therefore damper failure is no longer an issue in turbine design, and the performance of turbine components can be more accurately modeled at the design stage. The effects of wear-and-tear can be better predicted for the turbine components, and as a result, more reliable, more efficient and better modeled components can be employed at those locations subject to the most stresses and strains, e.g., hub rotor bearings 28a, 28b, generator bearings 40.

As the generator 32 is not subject to substantial reaction forces, the reliability of the generator 32 is increased as a constant air gap can be reliably maintained between the generator stator 36 and the generator rotor 38. Furthermore, as the generator 32 does not have to be load-balanced with regard to the forces due to the structural load of the rotor 20, the installation operation of a generator 32 in the turbine 10 is made substantially easier. Accordingly, preferably the generator 32 is provided as a single modular construction, which is easily mounted to the wind turbine main frame 14. This provides for easier installation and removal of a generator 32 to the wind turbine 10 without a relatively complicated load-balancing operation, and the replacement of an existing generator 32 with a new generator (e.g., for upgrade purposes) is made considerably more straightforward, and results in reduced down-time for the wind turbine 10 overall.

Similarly, the rotor 20 may also be provided as a singular modular construction, which can be relatively easily decoupled from the wind turbine main frame 14 for servicing and/or replacement.

Figure 7:
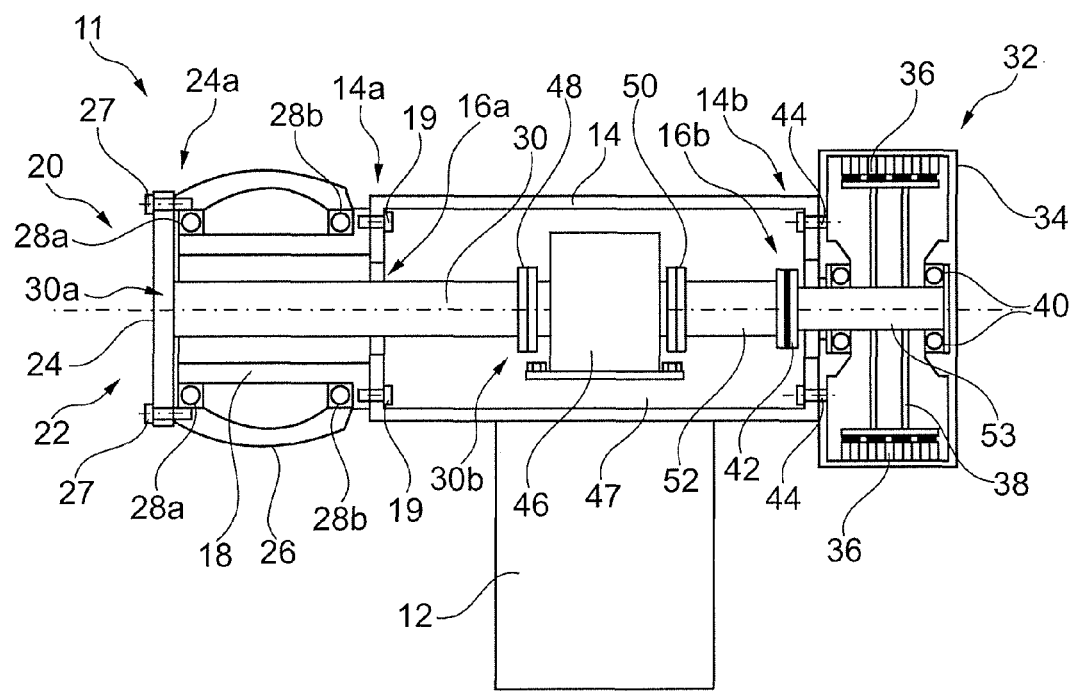
FIG. 7 illustrates a second embodiment of a wind turbine incorporating a drive shaft according to the invention.

With reference to FIG. 7, a second embodiment of a wind turbine according to the invention is indicated generally at 11. For the sake of brevity, components similar to those described in the first embodiment are indicated using the same reference numerals, and the relevant sections of the above description can apply to the embodiment of FIG. 6.

In the embodiment of FIG. 7, the wind turbine 11 further comprises a gearbox 46 having an input coupling 48 and an output coupling 50, the gearbox 46 rigidly mounted to the main frame 14 via base 47. The drive shaft 30 is directly connected to the gearbox 46 using input coupling 48, while the gearbox 46 is coupled to the generator 32 using a secondary shaft 52, the secondary shaft 52 extending between a gearbox output coupling 50 and the generator coupling 42. It will be understood that the secondary shaft 52 may be flexible in bending moments similar to the drive shaft 30, to prevent the transmission of any bending moments between the gearbox 46 and the generator 32.

Similar to the generator 32 as described in the first embodiment, as the drive shaft 30 is adapted to prevent transmission of bending moments from the rotor hub 22 to the gearbox 46, the gearbox does not have to be load-balanced with respect to the rotor hub 22. Accordingly, the gearbox 46 can be rigidly mounted to the main frame 14. Preferably, the gearbox 46 is releasably mounted to the main frame 14, allowing for relatively easy removal of the gearbox 46 from the wind turbine 11 for servicing and/or replacement.

The main frame 14 of FIGS. 6 & 7 is shown as a substantially enclosed structure, but it will be understood that other suitable constructions may be employed, e.g., an open-sided cradle construction, allowing relatively easy access to the contained components.

It will be understood that while the drive shaft 30 is shown as a hollow tubular construction any suitable shaft type may be used. The thickness of the wall of the drive shaft 30 preferably may be selected as less than 10 mm, 20 mm, 30 mm, 40 mm, etc. up to 400 mm thickness. It will further be understood that the drive shaft 30 may comprise any suitable nanocomposite material, e.g., nano clay, carbon nanotubes, nano silica etc. Preferably, the drive shaft 30 comprises an electrically insulating material—this would prevent the transmission of high levels electricity to components of the wind turbine which may be experienced in the event of a lightning strike. It will be understood that the drive shaft 30 may be chosen of any suitable length, e.g., more than 0.1 m, 1 m, 3 m, 5 m, 7 m, 9 m, 11 m, etc., in length.

It will be understood that the present invention is suitable for use in any suitable wind turbine construction, e.g., turbines having a maximum power rating of above 2 MW, 3 MW, 4 MW, up to and above 35 MW, etc. Preferably, the system is used in variable speed turbines.

The drive shaft 30 may be manufactured using any suitable manufacturing method or technique, e.g., Vacuum Assisted Resin Transfer Molding (VARTM), hand lay-up, injection molding, Resin Transfer Molding (RTM), spray lay-up, etc.

It will be understood that the generator 32 used in the design may be a permanent magnet generator (PMG), a synchronous generator, an asynchronous generator, a doubly-fed generator, etc.

The drive shaft 30 may be selected to have a maximum torsion capability, in that the shaft may break if the torsion acting on the shaft exceeds a defined level. This acts to protect the components of the generator 32 and/or gearbox 46 from any damage that might be incurred in the event of a sudden large increase in torque, e.g., a sudden gale force wind acting on the turbine rotor.

The drive shaft 30 may also be configured to be rated for a certain torsional vibration frequency, and to dampen and torsional vibrations above such a frequency. The ability to dampen high-frequency torsional vibrations allows for the system to reduce the effect of cocking or cogging torque. Cogging torque of electrical motors is the torque due to the interaction between the permanent magnets of the rotor and the stator slots of a Permanent Magnet (PM) machine, and can result in high-frequency "jerky" torque. As the drive shaft 30 can dampen these high-frequency torsional vibrations, it prevents the transmission of this "jerkiness" to the rotor 20 and the turbine blades, which would normally result in acoustic noise emission from the turbine.

It will be understood that the formed drive shaft may comprise any suitable attachment arrangements for coupling the drive shaft to the components of a wind turbine, e.g., flanges provided at the first and second ends of the shaft for bolting to the wind turbine. Any other suitable attachment methods may be utilized.

Figure 8:
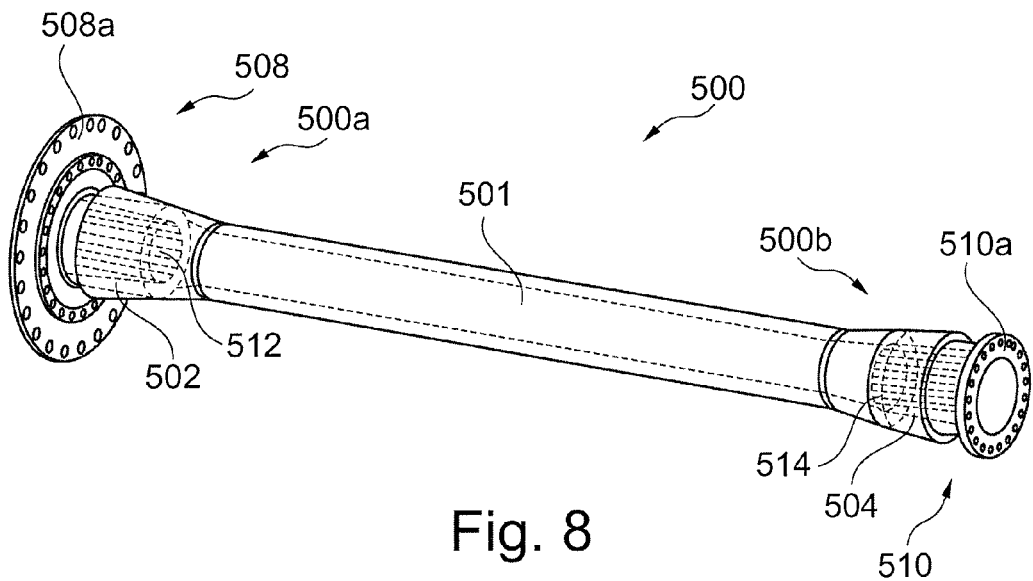
FIG. 8 is a perspective view of a drive shaft coupling mechanism for use in an embodiment of the invention.
Figure 9:
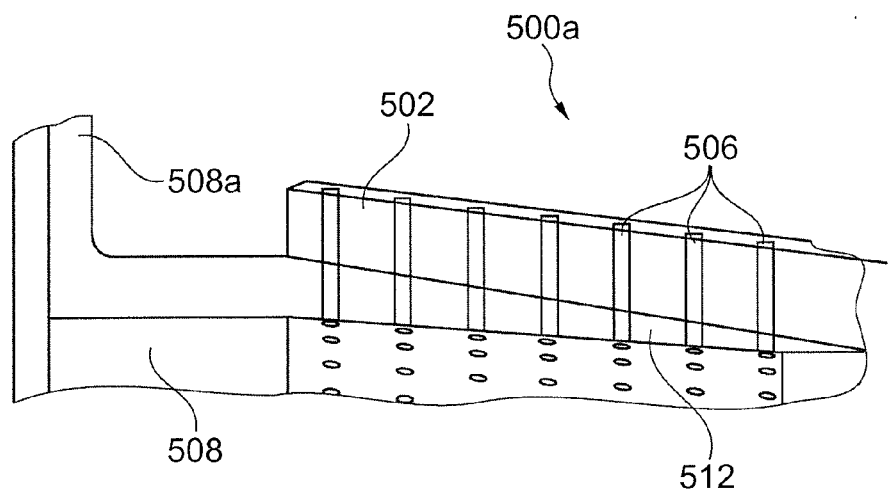
FIG. 9 is an enlarged cross-sectional view of the drive shaft coupling mechanism of FIG. 8.

With reference to FIGS. 8 and 9, a sample drive shaft coupling method according to an embodiment of the invention is illustrated for a sample drive shaft 500. For clarity of the drawings, the sample drive shaft 500 is shown without a rib, but it will be understood that the shaft 500 may comprise any suitable rib as described above.

The drive shaft 500 comprises a substantially cylindrical hollow body 501 having a first end 500a and a second end 500b. The first and second ends 500a, 500b are flared outwardly from the centerline of the shaft, providing flared sections 502, 504 of increasing diameter located respectively at the first and second ends 500a, 500b.

The drive shaft 500 further comprises first and second coupling flanges 508, 510. The first coupling flange 508 is provided at the first end 500a of the shaft 500, and the second coupling flange 510 is provided at the second end 500b of the shaft 500. The first and second coupling flanges 508,510 comprise circular bolting collars 508a, 510a which may be bolted to suitable wind turbine components, e.g., a wind turbine rotor hub, a generator rotor, a gearbox for connection to a generator system, etc.

The first and second coupling flanges 508, 510 further comprise first and second frus-toconical projections 512, 514 (seen in outline in FIG. 8) provided respectively on the first and second flanges 508, 510. The frustoconical projections 512, 514 are received within the respective first and second flared sections 502, 504 of the shaft body 501. A series of apertures are defined on the first and second frustoconical projections 512,514, the apertures arranged to receive a series of pins 506. The pins 506 project from the surface of the frustoconical projections 512, 514 away from the central axis of the shaft 500, and are received within the shaft body 501 at the flared sections 502, 504. (This arrangement can be seen in more detail in the enlarged cross-sectional view of FIG. 9, which shows a portion of the first frustoconical projection 512 received within the first flared section 502.)

In a preferred embodiment, the main shaft body 501 is formed from a fiber-based material, with the first and second coupling flanges 508, 510 formed from a resilient material, e.g., a metal such as steel, which is more suitable for bolting to wind turbine components than the fiber-based main shaft body 501. In a first embodiment, the fiber-based main shaft may be constructed as a standard shaft body, having flared ends corresponding to flared sections 302, 304. Holes are then formed in the flared ends, corresponding to the apertures provided on the frustocontical projections of the coupling flanges, e.g., by drilling holes in the flared ends of the shaft body. The series of pins may then be inserted in the holes in the flared ends to extend through to the apertures in the coupling flanges, to secure the coupling flanges to the main shaft body.

In a preferred construction of such a fiber-based main shaft, the main body 501 of the shaft is processed as a standard fiber-wound construction, with the coupling flanges 308, 310 provided with the series of pins 306 projecting from the surface of the frustoconical projections 312, 314, positioned at either end of the projected shaft body. When the fibers being currently wound to form the shaft body 501 reach one of the ends 500a, 500b of the shaft body and the particular coupling flange 508, 510 to be positioned at the end, the current fibers are applied to the surface of the frustoconical projection 512, 514 of the flange 508, 510 in question, with a plurality of the fibers wound around or intertwined with the pins 506 on the surface of the projection 512, 514, in order to provide for an equal distribution of forces from the coupling flanges to the shaft body, to improve the retention of the pins 506 within the shaft 500, and to improve the coupling between the shaft body 501 and the coupling flanges 508, 510. This embodiment of winding the fibers around the pins is also preferred as it prevents damage to the fibers of the shaft which may be caused by drilling holes in the flared sections of the shaft body.

The above describes a wind turbine construction which is of reduced weight, improved reliability, and can easily be serviced and upgraded.

The invention is not limited to the embodiments described herein, and may be modified or adapted without departing from the scope of the present invention.

What is claimed is:

1. A horizontal-axis wind turbine having a rotor with a diameter of at least 50 m length, the turbine comprising:
    a wind turbine main frame;
    a generator system comprising a generator that is rigidly mounted to said main frame without vibration damping elements;
    a rotor hub, the hub mounted to a rigid support shaft provided on the main frame, wherein the hub is operable to rotate about the support shaft and wherein the support shaft transfers the structural load of the hub to the main frame, and
    a drive shaft rigidly connected to and extending from the hub, wherein the drive shaft is connected to the generator system to transfer torque from the hub to the generator system, and wherein the drive shaft is a mechanically anisotropic shaft that has sufficient flexibility for preventing transmission of bending moments from the hub to the generator system by absorption of the bending moments; the drive shaft comprising a first coupling flange at is first end and a second coupling flange at its opposite end, the first coupling flange being bolted to said rotor hub and the second coupling flange being bolted to said generator system;
    wherein the drive shaft is only supported at said first and second coupling flanges by said hub and said generator system, the drive shaft being free of shaft bearings and rollers at locations between the first and second ends; and
    wherein the drive shaft comprises at least one rib to facilitate bending of the shaft.

2. The wind turbine of claim 1, wherein the at least one rib is helical.

3. The wind turbine of claim 2, wherein the drive shaft comprises a first end connected to the rotor hub and a second end connected to the generator system, the at least one helical rib substantially extending between the first end and the second end, and wherein the drive shaft is arranged such that the direction of twist of the at least one helical rib is in the opposite direction to the direction of rotation of the rotor hub coupled to the first end.

4. The wind turbine of claim 1, wherein the drive shaft comprises a composite fiber shaft, wherein a majority of the fibers in the drive shaft are oriented in a parallel winding direction.

5. The wind turbine of claim 4, wherein the fibers in the drive shaft are arranged such that at the at least one rib, the fibers extend in the direction of a plane substantially orthogonal to the direction of the central longitudinal axis of the drive shaft.

6. The wind turbine of claim 1, wherein the drive shaft is directly connected between the hub and the generator system.

7. The wind turbine of claim 1, wherein the rigid support shaft extends through the rotor hub and is connected to the hub at a most distal end of the hub, and wherein bearings are provided between an outer side of the rigid support shaft and an inner side of the hub.

8. A drive shaft for a wind turbine, the shaft comprising a cylindrical member having a first end for coupling to a wind turbine rotor hub and a second end for coupling to a wind turbine generator system, characterized in that the shaft is a fiber composite mechanically anisotropic shaft which is relatively flexible in bending moments and relatively stiff in torsion, wherein the shaft comprises at least one rib provided between the first end and the second end to facilitate bending of the shaft, and wherein the at least one rib is helical.

9. The shaft of claim 8, wherein the at least one helical rib extends from the first end to the second end.

10. The shaft of any claim 8, wherein the shaft comprises a fiber composite main shaft body and at least one coupling flange formed from a rigid material suitable for bolting, the at least one coupling flange arranged to couple with at least one end of the main shaft body.

11. A horizontal-axis wind turbine having a rotor with a diameter of at least 50 m length, the turbine comprising:
- a wind turbine main frame;
- a generator system;
- a rotor hub, the hub mounted to a rigid support shaft provided on the main frame, wherein the hub is operable to rotate about the support shaft and wherein the support shaft transfers the structural load of the hub to the main frame, and a drive shaft rigidly connected to and extending from the hub, wherein the drive shaft is connected to the generator system to transfer torque from the hub to the generator system, and wherein the drive shaft is a mechanically anisotropic shaft adapted to limit the bending moments transferred between the hub and the generator system,
- wherein the drive shaft comprises at least one rib to facilitate bending of the shaft, and
- wherein the at least one rib is helical.

* * * * *